United States Patent [19]

Atsumi

[11] Patent Number: 4,759,732
[45] Date of Patent: Jul. 26, 1988

[54] TRIM TAB ACTUATOR FOR MARINE PROPULSION DEVICE

[75] Inventor: Shinya Atsumi, Hamamatsu, Japan
[73] Assignee: Sanshin Kogyo Kabushiki Kaisha, Hamamatsu, Japan
[21] Appl. No.: 33,401
[22] Filed: Apr. 1, 1987
[30] Foreign Application Priority Data Apr. 1, 1986 [JP] Japan .................................. 61-72591

[51] Int. Cl.⁴ ...................... B63H 21/26; B63H 25/06
[52] U.S. Cl. ........................................... 440/1; 440/51
[58] Field of Search .............. 440/1, 51, 53; 364/400; 114/144 E, 275–277; 244/195

[56] References Cited

U.S. PATENT DOCUMENTS 4,352,666 10/1982 McGowan ............................ 440/51
4,509,924 4/1985 Hall ....................................... 440/51

FOREIGN PATENT DOCUMENTS 67298 4/1985 Japan ............................... 114/144 E Primary Examiner—Sherman D. Basinger
Attorney, Agent, or Firm—Ernest A. Beutler

[57] ABSTRACT

An improved trim tab actuator for a marine propulsion device wherein steering sharpness is improved by providing a pivotally supported trim tab that is steered in response to sensed steering conditions for achieving steering sharpness. In the illustrated embodiment, the steering input force and the steered angle of the outboard drive are measured steered conditions which determine the trim tab position. In addition, certain watercraft conditions such as speed and trim are further measured and determine the optimum trim tab position.

10 Claims, 2 Drawing Sheets

TRIM TAB ACTUATOR FOR MARINE PROPULSION DEVICE

BACKGROUND OF THE INVENTION

This invention relates to a trim tab actuator for a marine propulsion device and more particularly to an automatically activated trim tab device that improves steering accuracy and permits greater maneuverability.

It is well known that many types of watercraft and powered by outboard drives that are pivotally supported for steering movement about a generally vertically extending steering axis. Such outboard drives may comprise either outboard motors or the outboard drive portion of an inboard-outboard drive. Although this type of steering arrangement is particularly advantageous due to its simplicity, there are some instances when the steering movement accomplished by the mere pivotal movement of the outboard drive is insufficient to achieve the desired accuracy and speed in changing course.

The use of trim tabs in connection with outboard drives for effecting the steering of the outboard drive is well known. For example, one form of trim tab arrangement employs a trim tab that is pivotally supported on the outboard drive and which is steered in an opposite direction from the outboard so as to create a hydrodynamic force that assists in the steering movement. Although such devices are effective in providing light steering, they do not improve the accuracy of the steering and can, in some instances, deteriorate the amount of steering control. This deterioration in steering control can be objectionable in certain conditions, for example, when trying to steer in stormy weather or when traversing difficult terrain wherein numerous obstacles must be steered around.

There are also provided arrangements wherein a trim tab is employed for assisting in keeping the watercraft on course. Again, such devices are particularly advantageous for their intended purpose. However, these types of devices also do not aid in providing effective and quick change of course.

It is, therefore, a principal object of this invention to provide an improved trim tab actuator for a marine propulsion device.

It is a further object of this invention to provide a trim tab actuator for a marine propulsion device wherein the trim tab is automatically steered to maintain good steering control.

It is a further object of this invention to provide an automatically controlled trim tab actuator for improving steering sharpness and speed of response.

SUMMARY OF THE INVENTION

This invention is adapted to be embodied in a marine outboard drive that comprises a propulsion means and stearing means that mount the outboard drive for pivotal movement relative to the transom of an associated watercraft about a generally vertically extending steering axis and for pivoting the outboard drive about that steering axis for steering the watercraft. A trim tab is journaled on the outboard drive and is pivotal to positions for generating a hydrodynamic force for effecting steering of the watercraft. In accordance with the invention, means are provided for measuring a steering condition of the steering means and memory means are included for storing information as to the optimum trim tab positions for the measured steering condition. Means are included for steering the trim tab into the optimum position for the measured steering condition.

DETAILED DESCRIPTION OF THE PREFERRED EMBODIMENT

Figure 1:
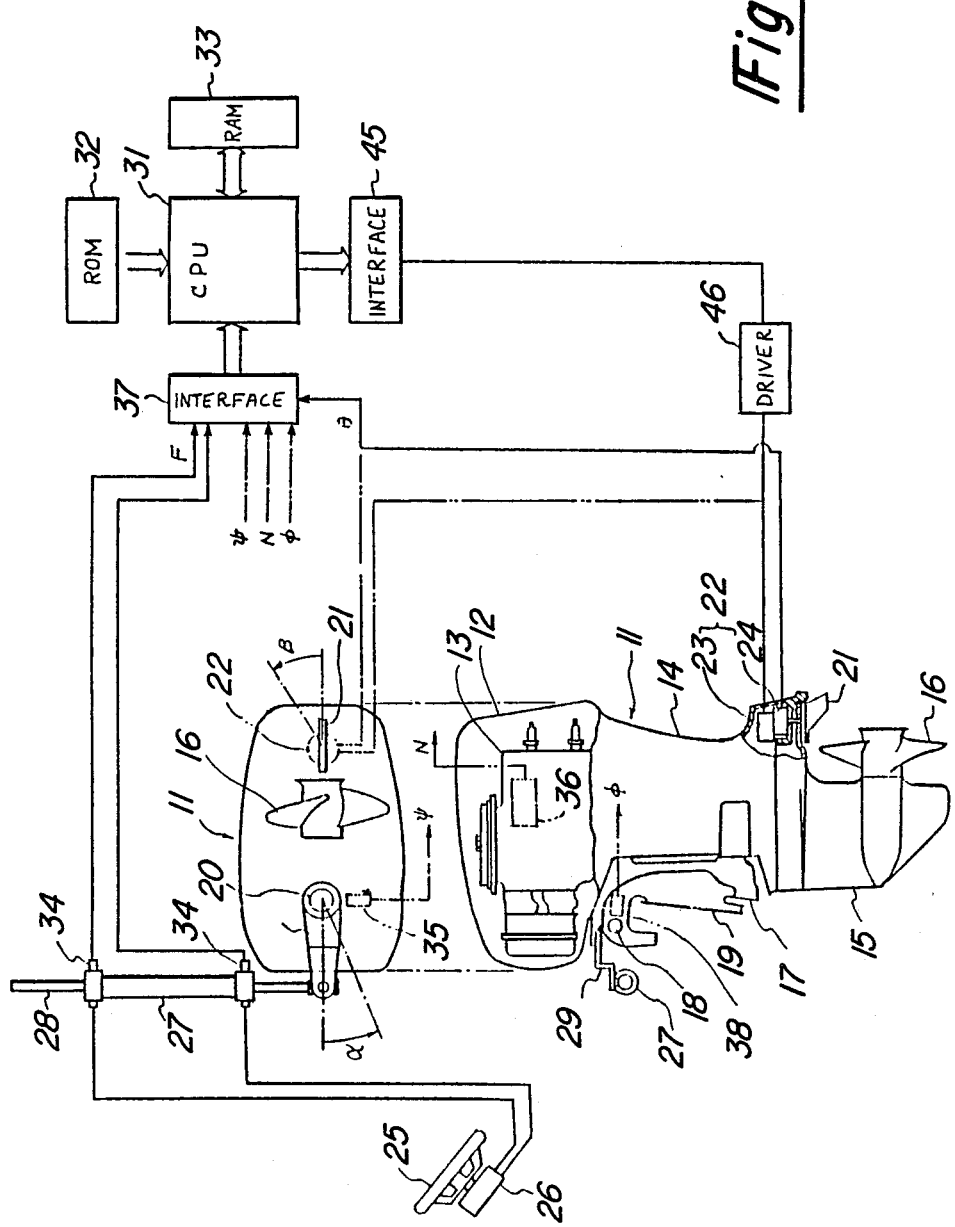
FIG. 1 is a side elevational view, with portions broken away and other portions shown schematically, and partial top plan view of a marine propulsion device embodying a trim tab actuator constructed in accordance with an embodiment of the invention.

Referring first to FIG. 1, an outboard motor constructed in accordance with an embodiment of the invention is identified generally by the reference numeral 11. Although the invention is described in conjunction with an outboard motor, it is to be understood that it may be employed with any form of outboard drive.

The outboard motor 11 includes a power head assembly, indicated generally by the reference numeral 12, and including an internal combustion engine 13, which may be of any known type. The engine 13 drives a drive shaft (not shown) that is journaled within a drive shaft housing 14 that depends from the power head 12. The drive shaft terminates within a lower unit 15 that is positioned at the lower end of the drive shaft housing 14 and drives a propulsion device in the form of a propeller 16 through a suitable forward, neutral, reverse transmission (not shown) which may be of any known type.

In accordance with standard outboard motor practice, the drive shaft housing 14 has affixed to it a steering shaft 20 that is journaled for steering movement about a generally vertically extending axis within a swivel bracket 17. The swivel bracket 17 is, in turn, pivotally connected by means of a pivot pin 18 to a clamping bracket 19. The pivotal connection afforded by the pivot pin 18 permits the outboard motor 11 to be tilted up or swung through a plurality of trim adjusted positions, as is well known in this art. The clamping bracket 19 affords an arrangement for detachably connecting the outboard motor 11 to the transom (not shown) of an associated watercraft. The construction of the outboard motor 11 as thus far described and its connection to the watercraft may be considered to be conventional. For that reason, further details of this construction are not believed to be necessary to understand and practice the invention.

In accordance with the invention, a trim tab, indicated generally by the reference numeral 21, is pivotally supported about an axis that extends parallel to the steering axis by means of the drive shaft housing 14 and in proximity to the lower unit 15 and propeller 16. The trim tab 21 is disposed so that it will be submerged in the water and will generate a hydrodynamic force for creating steering forces.

In accordance with the invention, an actuator device, indicated generally by the reference numeral 22 and including a reversible electric motor 23 and gear reduction unit 24, is coupled to the trim tab 21 for rotating it. The reversible electric motor 23 is controlled by means of a control system, to be described, so as to create the desired turning forces for accurate and quick steering.

The steering mechanism for the outboard motor 11 includes, in addition to the steering shaft and swivel bracket 17, a remotely positioned steering wheel 25. The steering wheel 25 operates a manually operated fluid pump 26 that supplies fluid through a pair of control lines to a hydraulic motor 27 that is mounted in a fixed position relative to the outboard motor 11 adjacent the transom of the associated watercraft. The fluid motor 27 has an internal piston which divides the fluid motor 27 into a pair of chambers and which piston is connected to a piston rod 28. the piston rod 28, in turn, has a pivotal connection to one end of a steering arm 29. The steering arm 29 is affixed to the outboard motor 11 and is effective to cause pivotal movement of the outboard motor about the steering shaft 20.

The trim tab 21 is activated, in a manner to be described, so as to provide the optimum steering condition dependent upon a variety of factors including the condition of the steering input, the actual steered angle of the outboard motor 11 and a variety of variable factors associated with the operation of the outboard motor 11 and the watercraft. Among these additional factors are speed of travel and trim angle. These conditions are, in accordance with the invention, sensed by any of a plurality of sensors and this information is fed to a central processing unit (CPU) indicated schematically at 31 which CPU also includes a ROM 32 and a RAM 33 and processes these signals and compares with preset values and then control the actuating device 22 so as to set the trim tab 21 in the appropriate position to obtain optimum steering for the watercraft conditions.

Realizing the invention, it is believed to be within the scope of those skilled in the art to determine which of these factors will be employed to achieve the control of the trim tab 21 and how, in fact, they are sensed. It should be understood that with certain watercraft, certain of these factors may be insignificant and others more important.

In the illustrated embodiment, the steering input force is measured by means of a pair of pressure sensors 34 that are positioned in the chambers at the opposite ends of the fluid motor 27. These devices are pressure devices which indicate a pressure which is equivalent to force. It is to be understood, however, that force can be measured in any other manner such as by means of a strain gauge. Also, in cable operated steering mechanisms, the steering force can be measured by a strain gauge of the tension in the cable or any other known manner for so measuring forces.

The angle of steered condition of the input to the steering mechanism α is measured by a sensor 35 which outputs an angular steering position signal indicated at $\psi$.

Other conditions such as watercraft speed is sensed by an engine speed sensor, indicated generally at 36, which may comprise the pulser coil of the ignition system of the engine 13. This engine speed sensor outputs an engine speed signal N which, with the other sensed condition signals, is delivered to an input interface 37 which converts the signal into an appropriate signal for processing by the CPU 25. Alternatively to sensing engine speed, the watercraft speed may be sensed in any of a variety of fashions, such as by utilizing an actual water speed sensor (ideally a velocity sensor in proximity to the propeller 16) or in any known manner.

In accordance with the illustrated embodiment, the trim angle of the watercraft is also sensed by means of a trim condition sensor 38 that is carried by the swivel bracket 17 and which outputs a trim angle signal $\phi$ to the interface 37 for conversion into an approrite signal for transmission to the CPU 31. In the illustrated embodiment trim angle and watercraft velocity are the only two watercraft conditions which are sensed and processed by the CPU 31. As aforenoted, however, a wide variety of other watercraft conditions may be sensed and processed by the CPU 31.

The gear reduction unit 24 also includes an angle position sensor for sensing the angular position β of the trim tab 21. This sensor outputs a signal $\theta$ to the interface 37 for conversion into an appropriate signal for processing by the CPU 31.

The CPU 31 and its RAM 33 and ROM 32 are preprogrammed, in manner to be described, so as to compare the steering input forces F, the steered angle $\psi$ sensed speed N and trim angle condition $\phi$ and to generate an output signal indicative of the desired trim tab position for these sensed conditions. The CPU 31 also receives the signal indicating the trim tab position $\theta$ and makes an internal comparison to determine if the trim tab angle that is existent is the desired angle or not. This processing may be best understood by reference to FIG. 2, which is a block diagram showing the logic of the CPU 31.

Figure 2:
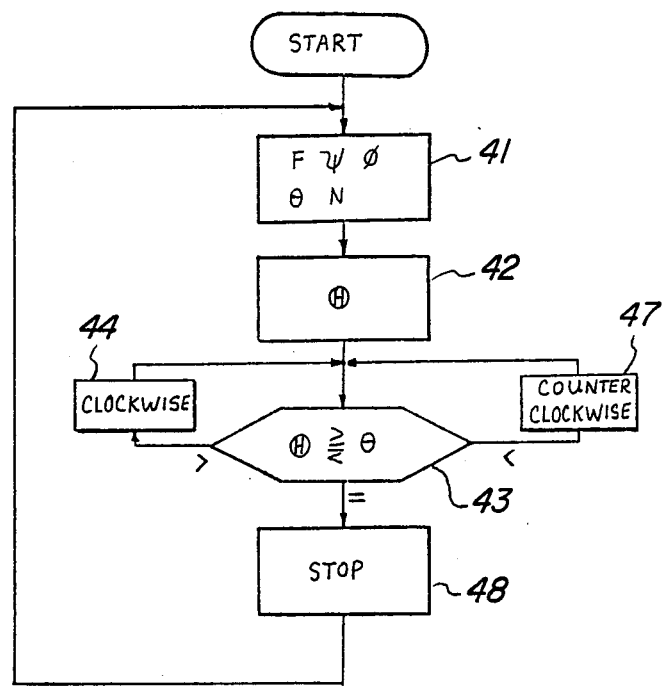
FIG. 2 is a block diagram showing the logic of the CPU in setting the trim tab device in accordance with an embodiment of the invention.

In FIG. 2, at the initialization or starting step, which is initiated when the main switch (not shown) is switched on, the CPU 25 performs an initialization step and then reads the input signals of steering input force F, steering angle $\psi$, engine speed N, trim angle $\phi$ and trim tab angle $\theta$ sequentially through the interface 37 at the step 41. These signals are then stored temporarily in the RAM 27 at this same step 47.

From this input signals of steering input force, steering angle, speed, trim position, and trim tab position (F, $\psi$, N, $\phi$ and $\theta$), the CPU output a signal ⒽⓋ at the block 42 which comes from a map which has been memorized in the ROM 32. Alternatively, if the optimum trim tab angle Ⓗ is memorized in the ROM 32 as an operational expression, the CPU determines the appropriate output signal Ⓗ from the noted values of F, $\psi$, N and $\phi$.

After the output signal Ⓗ is generated, the CPU compares that signal with the actual trim tab angle position $\theta$ at the step 43. If clockwise adjustment is necessary, the system moves to the block 44 so as to activate the motor 23 in the appropriate direction through an output interface 45 (FIG. 1) and driver 46 so as to achieve rotation in this direction. On the other hand, if counterclockwise rotation is determined, the system moves to the block 47 and achieves this rotation. The rotation continues cyclically until the comparison indicates that the actual trim tab angle $\theta$ is equal to the desired trim tab angle Ⓗ and then the program is stopped at the step 39.

It should be noted that in order to obtain more rapid and sharper steering, the trim tab 21 is rotated in the same direction as the outboard motor 11 so as to achieve a quicker steering operation. This is in contradistinction to the prior art systems wherein the trim tab is rotated in the opposite sense so as to assist in reducing steering forces rather than by achieving steering sharpness.

The preset or optimum trim tab position Ⓗ for the various sensed steering conditions and watercraft running conditions can be preset at the factory. That is, the factory can preset the CPU 25 based upon the anticipated values required by the watercraft with which the outboard drive 11 will be employed. Alternatively, the system may be such that the operator may himself determine by trial and error the desired trim tab position to desired steering sharpness for each running condition and preprogram the computer in response to this trial and error setting. The means by which this may be done is believed to be well within the scope of those skilled in this art.

It should be readily apparent, therefore, that the illustrated device is extremely effective in setting the desired trim tab angle for any of the sensed running conditions of the watercraft. In this way, the watercraft will be maintained on course without the necessity of the operator making continuous corrections.

Although an embodiment of the invention has been illustrated and described, various changes and modifications may be made without departing from the spirit and scope of the invention, as defined by the appended claims.

I claim:

1. A marine outboard drive comprising propulsion means, steering means for mounting said outboard drive for pivotal movement relative to the transom of an associated watercraft about a generally vertically extending steering axis and for pivoting said outboard drive about said steering axis for steering the watercraft, a trim tab journaled on said outboard drive and pivotal to positions for generating a hydrodynamic force for effecting steering of the watercraft, means for measuring a steering condition of said steering means, memory means for storing information as to the optimum trim tab positions for the measured steering condition, and means for steering the trim tab into the optimum position for the measured steering condition.

2. A marine outboard drive as set forth in claim 1 wherein the measured steering condition is the force of input to steer the outboard drive.

3. A marine outboard drive as set forth in claim 1 wherein the measured steered condition comprises the angle of pivotal movement of the outboard drive about the steering axis.

4. A marine outboard drive as set forth in claim 3 wherein the measured steering condition is the force of input to steer the outboard drive.

5. A marine outboard drive as set forth in claim 1 further including means for measuring a watercraft running condition, the memory means further storing information as to the optimum trim tab position for the measured watercraft condition.

6. A marine outboard drive as set forth in claim 5 wherein the measured watercraft condition is speed.

7. A marine outboard drive as set forth in claim 5 wherein the measured watercraft condition is the trim condition of the outboard drive.

8. A marine outboard drive as set forth in claim 7 wherein the measured steering condition is the force of input to steer the outboard drive.

9. A marine outboard drive asset forth in claim 7 wherein the measured steered condition comprises the angle of pivotal movement of the outboard drive about the steering axis.

10. A marine outboard drive as set forth in claim 9 wherein the measured steering condition is the force of input to steer the outboard drive.

* * * * *